United States Patent Office 3,319,760
Patented May 16, 1967

3,319,760
MECHANICAL HANDLING EQUIPMENT
Francis Duncan Sheldon and Charles Alan North, both of Tividale, Tipton, England, assignors to The Lawrence Engineering Company Limited, Tividale, Tipton, England, a British company
Filed May 25, 1965, Ser. No. 458,666
4 Claims. (Cl. 198—32)

This invention relates to mechanical handling equipment, and in particular to the handling of pallets loaded with a plurality of boxes, crates, parcels, or other articles.

In factories, warehouses and the like there is often the necessity of unloading palleted loads. For example, stacks of bottle crates may be transported on pallets and require to be unloaded so as to travel in single or other file along a conveyor, preferably at regular spaced intervals, for emptying and/or re-filling. The object of this invention is to provide mechanical handling equipment of particular use in the conveying and spacing of the articles after unloading per se has been effected.

In accordance with the present invention, mechanical handling equipment comprises a feed conveyor and a discharge conveyor, the feed conveyor comprising a plurality of sections, one of which is provided with elevating means so that the elevated section may prevent transfer of articles along the feed conveyor, said discharge conveyor extending transversely of the feed conveyor and being provided with an accelerating section and with means for turning any misaligned articles, whereby a block of articles on the feed conveyor may be discharged in a single spaced line.

The equipment may be associated with the equipment described in our co-pending applications for Letters Patent Ser. Nos. 458,667 (filing date May 25, 1965) and 458,670 (filing date May 25, 1965).

Figure 1:
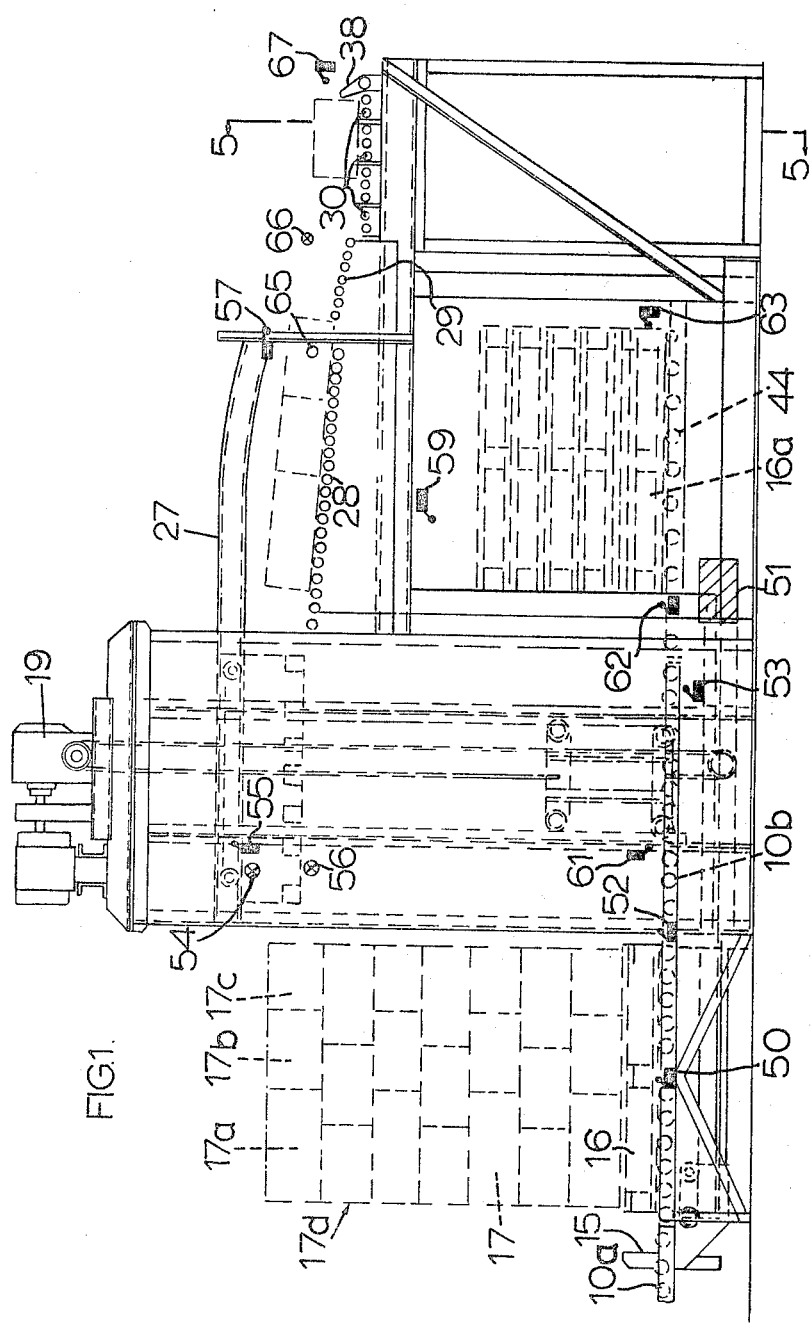
Figure 2:
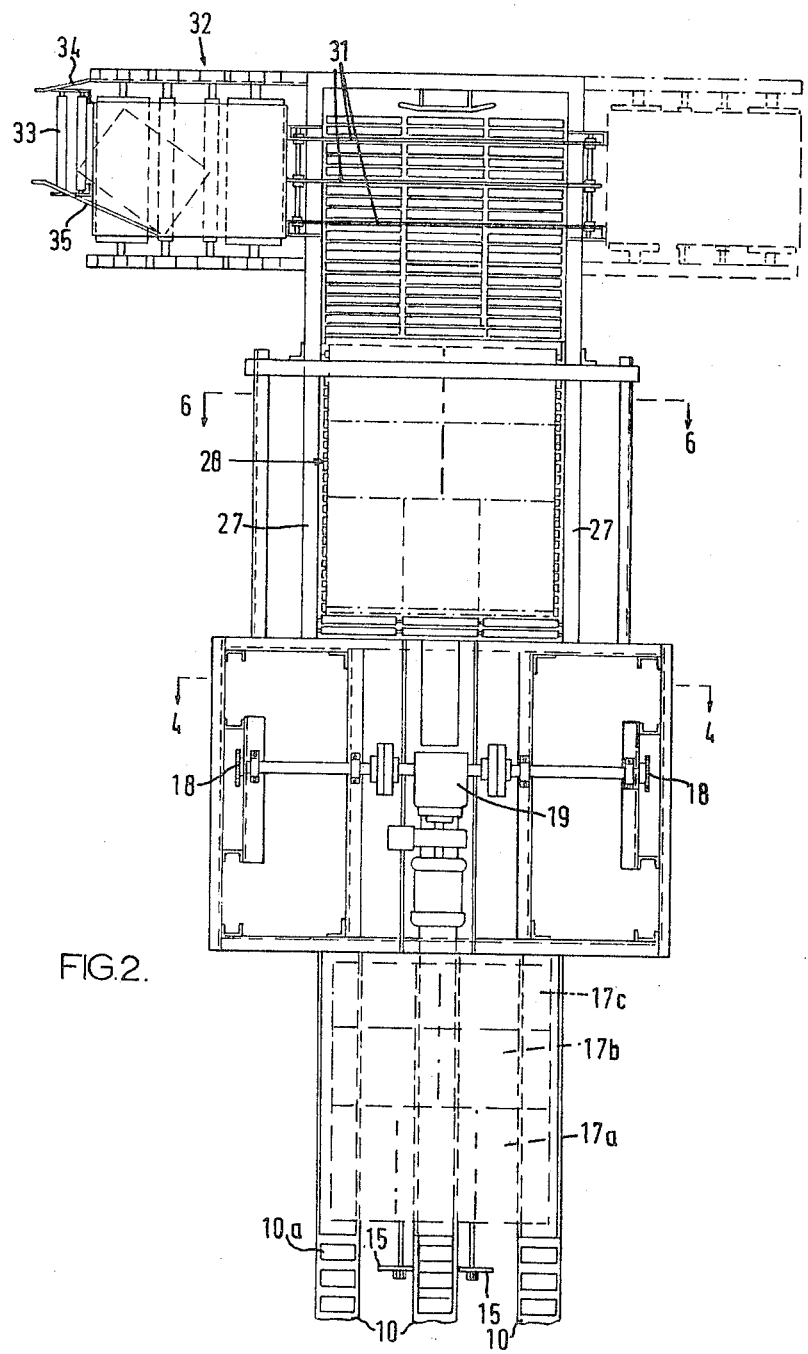
Figure 3:
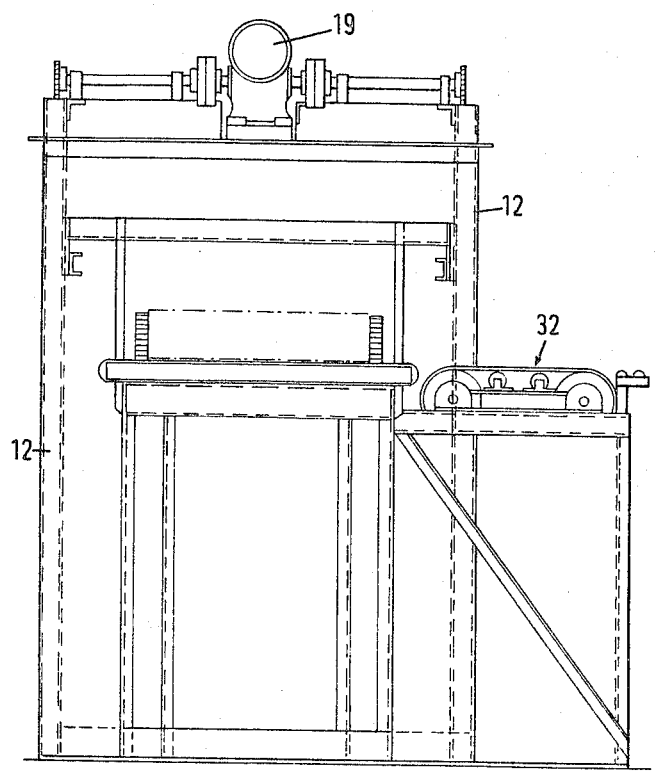
Figure 4:
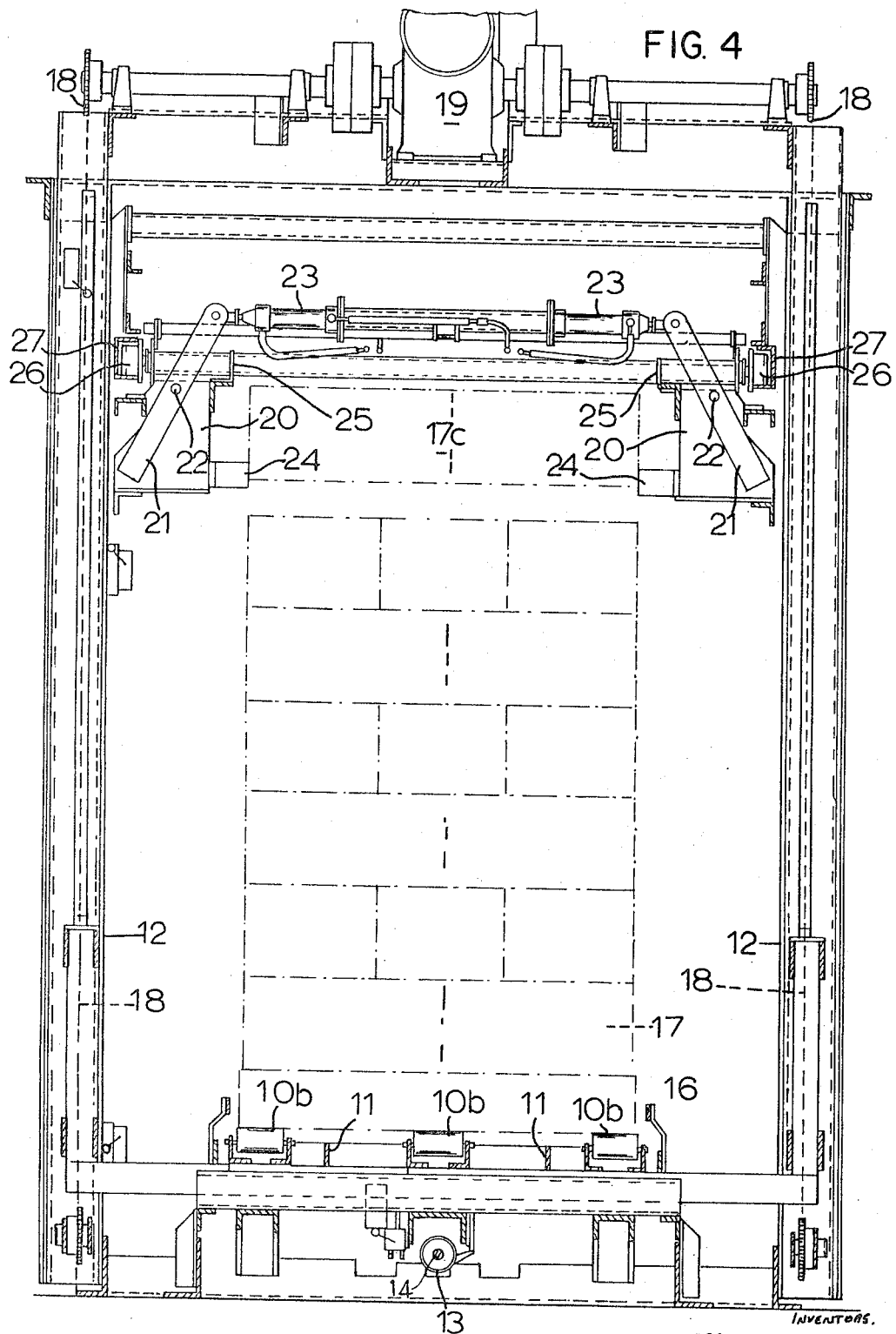
Figure 5:
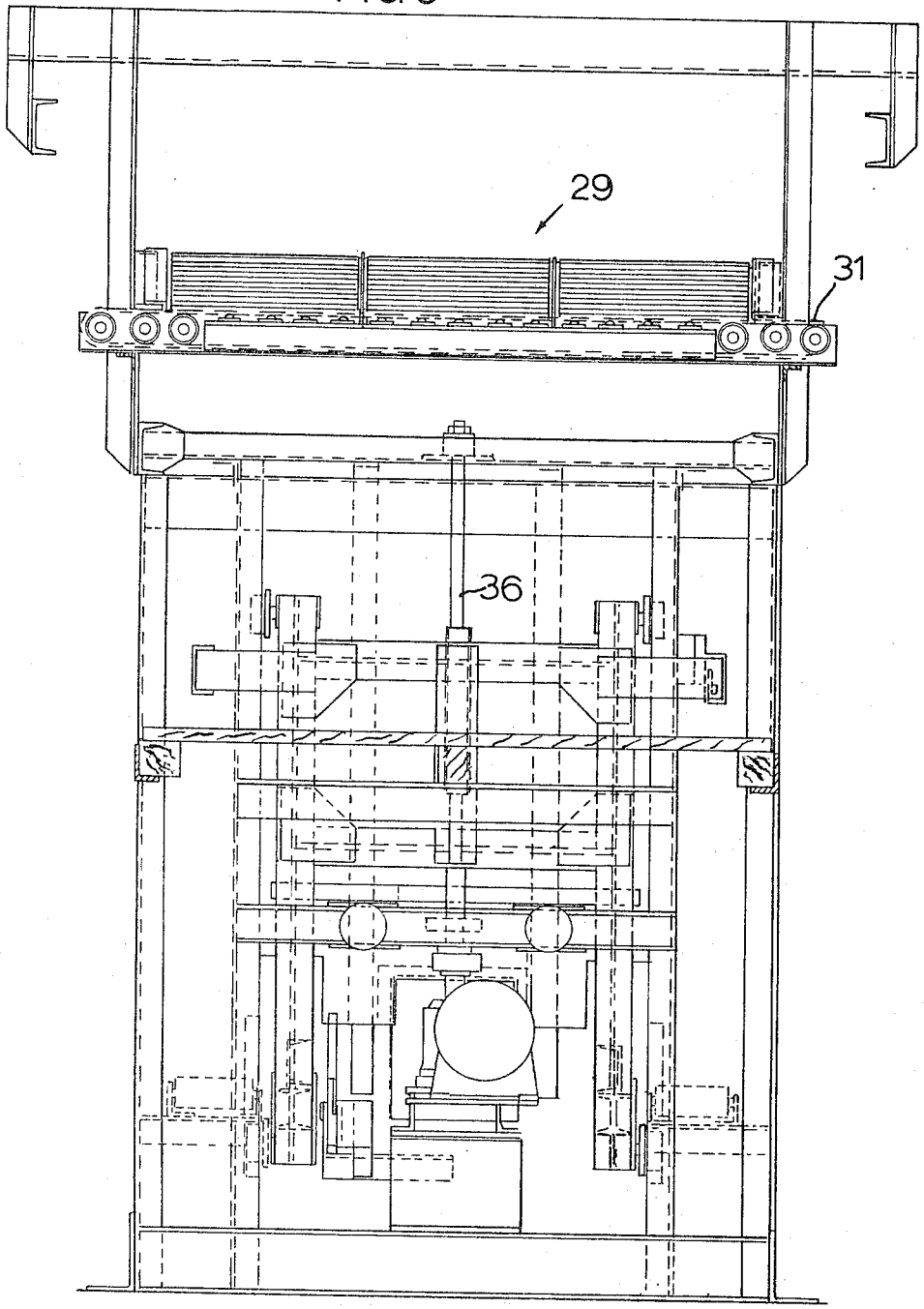
Figure 6:
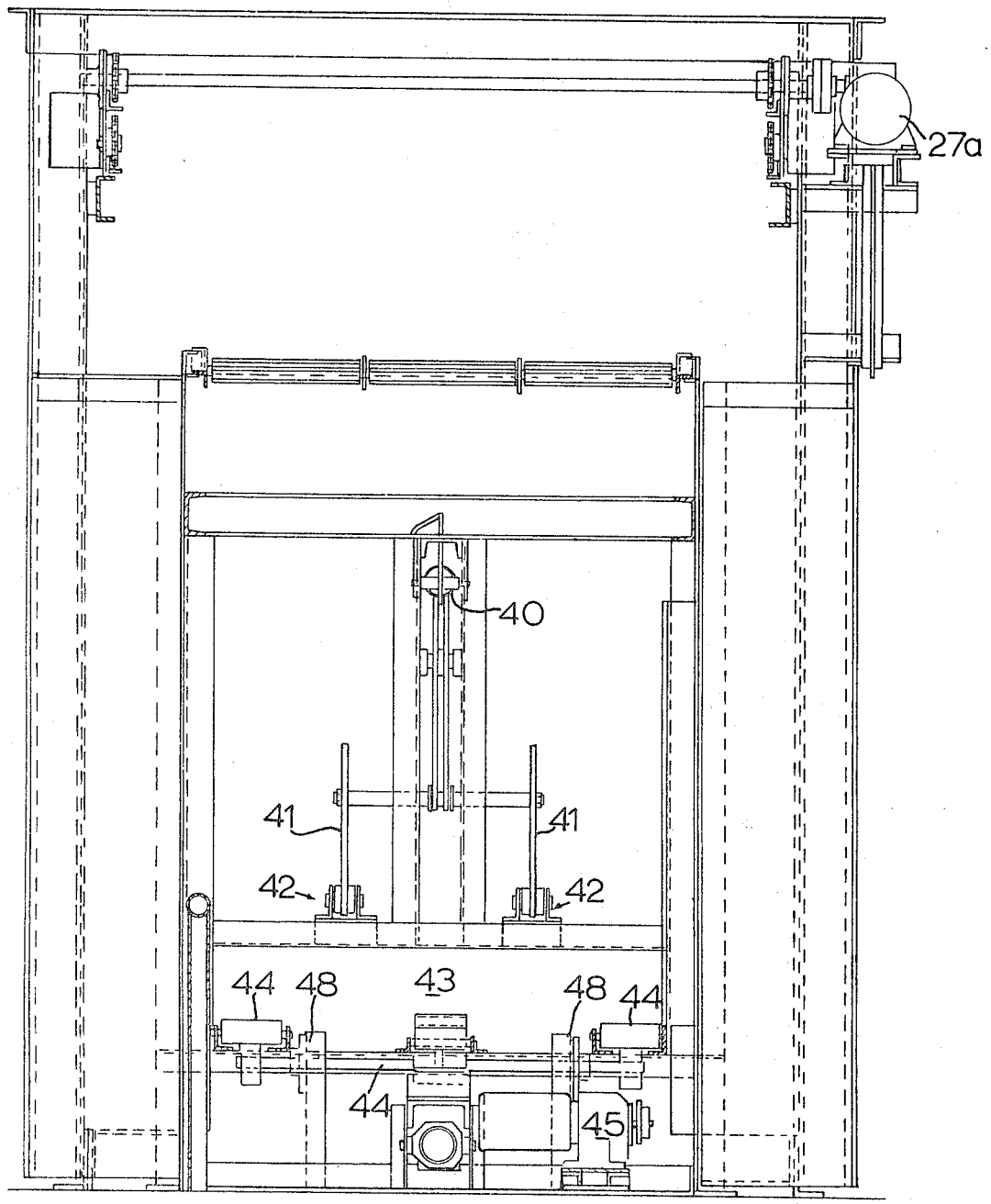

One complete fully automatic machine embodying the present invention will now be described by way of example and with reference to the accompanying drawings, wherein:

FIGURE 1 is a side-elevation of the machine;
FIGURE 2 is a plan view of the machine;
FIGURE 3 is an end elevation of the machine;
FIGURE 4 is a section through the machine, taken on the line 4—4 of FIGURE 2 to show the elevator;
FIGURE 5 is a section through the machine, on the line 5—5 of FIGURE 1 to show the discharge arrangements, and
FIGURE 6 is also a section through the magazine on the line 6—6 of FIGURE 2 to show the pallet magazine.

The machine shown in the drawing comprises a plurality of conveyors, a first conveyor 10 is the inlet conveyor which consists of three parallel series of freely rotatable rollers, divided lengthwise into two sections 10a, 10b, see FIGURE 1, one of which 10a is freely accessible to permit a loaded pallet to be deposited thereon by a forklift truck or other means, and the second and subsequent section 10b is disposed over or about an elevator frame 11 in an elevator shaft structure 12. The said first conveyor 10 has an associated pneumatic cylinder 13 of which the ram 14 is coupled to a pusher 15 so that when the cylinder and its associated piston rod are contracted the pusher (sliding betwen the roller series) displaces a pallet 16 and its load 17 into the elevator shaft.

The elevator frame 11 is carried on a sprocket driven chain 18 (FIGURE 4) powered by a reversible motor 19 with a fixed centre sprocket at the opposite end of the chain run to the motor sprocket and with the frame pinned to the chain. (Alternatively other means may be used, e.g. a screw device.) The elevator shaft is provided with guide means to maintain the loaded pallet level and steady when the elevator frame is lifted and lowered, and also with means to centralise an unequally loaded pallet.

The upper end of the elevator shaft houses clamp means (FIGURE 4) comprising a pair of movable abutments 20 carried by links 21 pivoted to the abutments at 22 and to a pair of linked pistons and cylinders 23. To accommodate pallet loads with regular shapes, such for example as that shown which comprises (FIGURE 1) a stack of bottle crates rectangular in plan loaded seven crates to a layer, one row 17a of these having longer sides parallel to the first conveyor axis 10 and two rows 17b, 17c of two crates disposed at 90° to the row of three, the movable abutments comprise resilient pads 24: for irregular loads the abutments may be in separate parts carried by separate cylinders, or in linked and spring urged parts, or, where the load can be standardised, may be specially shaped to suit.

'In general the frame is raised to bring the top layer of articles 17d within the clamp means which are then actuated to hold the layer whilst the frame is lowered slightly with the pallet and lower layers to the position shown in FIGURE 4.

The clamp means is mounted on a trolley frame 25 having wheels 26 which run on rails 27 (FIGURES 1 and 4) and is reciprocable by a further piston and cylinder, rack and pinion, or like mechanism (not shown) between a position within the elevator framework and a position over the first section 28 of a second conveyor, FIGURE 1.

The second conveyor is a feed conveyor comprising three sections 28, 29, 40. The first section of this conveyor extends away from the elevator shaft and is a gravity roller conveyor. The second section is aligned with the opposite end of the first section and is arranged to be raised and lowered above and to the level of the first section by further piston and cylinder or other means (not shown).

When the clamped layer of articles is released on to the first section the layer rolls along the first section to the second section of the second conveyor.

The elevator frame is then raised, the new top layer is clamped, the elevator frame lowered, the trolley reciprocated and the clamp released, this cycle being repeated until the pallet is empty when it is lowered to the base of the elevator shaft, when a fresh loaded pallet can be then fed into the shaft to start a new unloading cycle, and expel the empty pallet into the pallet magazine.

As the articles pass down the first section of the feed conveyor, they pass onto the second section which is then raised so that its end adjacent the first section rises to act as a stop after one article, or one row of articles have passed on to it. The first articles then pass on to the third and final section 30 of feed conveyor and on to a transversely extending discharge conveyor which is a chain conveyor with a plurality of chains 31 located between and parallel to the rollers of section 30 and which feed the row in the direction of its length and feeds to a discharge conveyor: the latter has an accelerating section 32 so that the articles are spaced apart, and a discharge section 33 which carries fenders 34, 35 arranged so that any article 17 not properly aligned is turned until it is so aligned. Hence, if the third row (containing three crates) of the seven crate layer previously referred to is being fed through the said discharge section, all of the crates are turned till they are aligned with the first four crtaes which preceded them. The fenders are adjustable to allow for different loads and sizes.

The said third section of the feed conveyor is meshed with the chain conveyor as stated and is mounted on a further cylinder unit 36 FIGURE 5 so that when initially above the discharge conveyor it carries the articles over the chain conveyor and is then lowered to take the articles into contact with said chain conveyor. Suitable guides 38 (FIGURE 1) are provided to prevent overshooting.

After the final section of the feed conveyor has been lowered the second section of this is also lowered to permit a further article or row of articles to pass to the third and final section, which is raised preparatory to their arrival. This alternate raising and lowering is repeated as long as articles are being fed through the machine.

In a mechanised factory or warehouse, the empty pallets will often be collected in batches and to simplify their handling, the empty pallet discharge rollers discharge the pallets into a pallet magazine.

The pallet magazine (FIGURE 6) has a clamp means located fore and aft of the conveyor 10 and generally similar to the elevator shaft, comprising a piston and cylinder mechanism 40, levers 41, and abutments 42, located so that when the lowest pallet 16a (FIGURES 1 and 6) in a stack is clamped, there is a space, generally indicated at 43 FIGURE 6, below that pallet to accommodate a fresh one. The pallet magazine is provided with a powered track 44 to drive (from motor 45) the pallet fed into it to a predetermined position, and elevator forks 48 FIGURE 6 driven by a rack and pinion, lift screw or the like from a reversible motor are provided that the stack as a whole can be raised, clamped, and then the forks lowered below the track to accommodate the next pallet.

Loads of empty pallets can be removed as desired.

The machine so far described is conveniently made fully automatic and the completion of one part of a cycle of operations initiates the next part.

One complete cycle of operations will now be described for a fully automatic machine handling bottle crates.

Assuming the machine to be empty of pallets and crates, the weight of a loaded pallet 16 placed on the inlet conveyor 10 operates a first limit switch 50, and, via a solenoid 51, reverses the cylinder 13 which pushes the loaded pallet into the elevator shaft. A second switch 52 is reset as the pallet reaches its desired position to stop the cylinder: the cylinder is readied for a repeat cycle by pneumatic valve 53: switch 63 (manually operated in this instance) starts the elevator hoist motor 19 which raises the loaded pallet until a light beam affecting a first photoelectric cell 54 is interrupted to cause the motor to stop and to operate the clamp means. After a predetermined delay the hoist motor is reversed and lowers the elevator frame with pallet until a second and lower light beam 56 is re-established: this actuates the means which displaces the trolley and clamp means to transfer the load out of the elevator shaft. As the said load reaches its extended position switch 57 releases the clamp, and the articles drop onto the conveyor 28: simultaneously or substantially so switch 57 actuates means to return the trolley, the elevator motor is reversed and re-energized and the pallet rises to take the new top surface of the stack of crates to the same level as before. This part of the cycle involving raising and lowering of the elevator frame, clamping and release, and reciprocation of the trolley, is repeated until the empty pallet is raised against a limit switch 55, when the pallet is lowered, operates a limit switch 61 and stops the elevator motor.

As a new pallet is introduced into the elevator it displaces the old pallet into the pallet magazine and trips switch 62 to start the discharge motor; the switch is reset to stop the motor when the pallet is fully within the magazine. A new unloading cycle is initiated by the arrival of the new pallet. The empty pallet operates switch 63 to operate the elevator motor and also release the pallet magazine clamp and raise the pallet elevator forks: after a delay, the clamp engages the raised empty pallet, and is held on whilst the forks are returned. This part of the cycle is repeated whenever a new empty pallet reaches the magazine until the stack reaches a predetermined height when a warning may be given and/or the whole machine stopped by switch 59.

As the crates travel down the feed conveyor they brake a light beam 65 which in known manner actuates solenoid valves: these valves cause the second section of the track to lift immediately (via the cylinder) and allow only the first row of crates to travel on, and simultaneously raise the third section of track, this operates cell 66 to control the lifting and lowering means. As the light beam is re-established the third section is lowered as previously explained and then the second section. The lowering of the second section to permit the next row of crates to travel on may be controlled by a further switch 67 actuated when the third section is clear of crates. Switch 50 merely readies the machine for the new pallet load to be pushed into the elevator which is delayed until the elevator is emptied as signalled by switch 62. Cylinder 13 is reversed by the same mechanism.

In this manner, the machine operates automatically and without supervision.

We claim:

1. Mechanical handling equipment for providing a single line of spaced and aligned individual articles from a block-like layer of such articles, said layer comprising a plurality of side-by-side rows of articles, comprising:
    (i) a first conveyor for receiving the whole of said layer.
    (ii) a second conveyor lowerable into alignment with the first conveyor to receive a first row of articles therefrom and raisable to serve as an obstacle to the subsequent row of articles in said layer,
    (iii) means for lowering and raising said second conveyor,
    (iv) a third conveyor extending transversely of the second conveyor for receiving said row of articles from said second conveyor and conveying said row longitudinally,
    (v) accelerating means in said third conveyor for separating and spacing the articles in said row, and
    (vi) turning means for turning any misaligned articles.

2. Mechanical handling equipment as claimed in claim 1, wherein the turning means comprises adjustable fenders located along the third conveyor for turning any non-aligned articles into alignment.

3. Mechanical handling equipment providing a single line of spaced and aligned individual articles from a block-like layer of such articles, said layer comprising a plurality of side-by-side rows of articles, comprising:
    (i) a first gravity roller conveyor for receiving the whole of said layer,
    (ii) a second gravity roller conveyor lowerable into alignment with the first conveyor to receive a first row of articles therefrom and raisable to serve as an obstacle to the subsequent row of articles in said layer,
    (iii) means for lowering and raising said second conveyor,
    (iv) a third conveyor including a powered multi-chain conveyor section extending transversely of the second conveyor, for receiving said row of articles from said second conveyor and conveying said row longitudinally,
    (v) a transfer gravity roller conveyor having parallel rollers extending between the chains of the multi-chain conveyor section and being raisable into alignment with the second conveyor when the latter is in its raised position so as to receive said row of articles therefrom, and lowerable to transfer said row of articles to the multi-chain conveyor section,
    (vi) means for raising and lowering said transfer conveyor,
    (vii) said third conveyor including an accelerating conveyor section aligned with the multi-chain conveyor section, for successively receiving therefrom each article in said row of articles and for accelerating each article so as to separate the articles in said row,
    (viii) turning means comprising adjustable fenders located along the third conveyor for turning non-aligned articles into alignment, (ix) control means for causing:
(a) raising of the second conveyor and the transfer conveyor when said first row of articles has been received by the second conveyor, and
(b) lowering of the second conveyor and the transfer conveyor, so that the second conveyor is aligned to receive a subsequent row of articles from the first conveyor as said first row of articles is transferred to said multi-chain conveyor section.

4. Mechanical handling equipment as claimed in claim 3, wherein the control means comprises a photocell disposed adjacent the first and second conveyor and actuable by a first row of articles as the latter is received by the second conveyor:
(a) to cause raising of the latter to serve as an obstacle to any subsequent row of articles, and
(b) to cause raising of the transfer conveyor so that the latter can receive the first row of articles from the raised second conveyor,
(c) the photocell also being actuable by the first row of articles as the latter moves beyond the range of the photocell,
(d) to cause lowering of the second conveyor into alignment with the first conveyor to receive a subsequent row of articles therefrom and
(e) to cause lowering of the transfer conveyor to transfer the first row of articles to the multi-chain conveyor section.

References Cited by the Examiner

UNITED STATES PATENTS

| | | | |
|---|---|---|---|
| 2,986,262 | 5/1961 | Powers | 198—29 |
| 2,996,782 | 8/1961 | Kovach et al. | 198—76 X |
| 3,101,851 | 8/1963 | Heide et al. | 214—8.5 X |
| 3,108,677 | 10/1963 | Temple | 198—21 |

EVON C. BLUNK, *Primary Examiner.*

A. C. HODGSON, *Assistant Examiner.*